(12) United States Patent
Dayt

(10) Patent No.: US 8,863,354 B2
(45) Date of Patent: Oct. 21, 2014

(54) FLANGED ROLLER

(75) Inventor: Patrick Dayt, Besancon (FR)

(73) Assignee: Tente Roulettes Polymeres—Bruandet, La Barre (FR)

( * ) Notice: Subject to any disclaimer, the term of this patent is extended or adjusted under 35 U.S.C. 154(b) by 8 days.

(21) Appl. No.: 13/808,734

(22) PCT Filed: Jun. 29, 2011

(86) PCT No.: PCT/FR2011/000375
§ 371 (c)(1),
(2), (4) Date: Jan. 7, 2013

(87) PCT Pub. No.: WO2012/007652
PCT Pub. Date: Jan. 19, 2012

(65) Prior Publication Data
US 2013/0104338 A1 May 2, 2013

(30) Foreign Application Priority Data

Jul. 12, 2010 (FR) .................................... 10 02917
Dec. 6, 2010 (FR) .................................... 10 04731

(51) Int. Cl.
*A47B 91/00* (2006.01)
*B60B 33/00* (2006.01)
*B60B 7/00* (2006.01)
*B60B 7/06* (2006.01)

(52) U.S. Cl.
CPC ......... *B60B 33/0036* (2013.01); *B60B 33/0073* (2013.01); *B60B 33/0057* (2013.01); *B60B 33/0021* (2013.01); *B60B 33/0042* (2013.01); *B60B 33/0049* (2013.01); *B60B 7/008* (2013.01); *B60B 33/0068* (2013.01); *B60B 7/061* (2013.01)

USPC ............................................................ 16/45

(58) Field of Classification Search
USPC ............ 16/45; 301/37.101–37.43, 108–108.3
See application file for complete search history.

(56) References Cited

U.S. PATENT DOCUMENTS 5,058,959 A * 10/1991 Miles et al. ................. 301/108.2
5,215,356 A * 6/1993 Lin .......................... 301/111.07

(Continued)

FOREIGN PATENT DOCUMENTS

| EP | 1 543 996 A2 | 6/2005 |
| EP | 1 736 325 A2 | 12/2006 |
| WO | 98/18637 A1 | 5/1998 |

OTHER PUBLICATIONS

International Search Report, dated Nov. 3, 2011, from corresponding PCT application.

*Primary Examiner* — Victor Batson
*Assistant Examiner* — Matthew Sullivan
(74) *Attorney, Agent, or Firm* — Young & Thompson

(57) ABSTRACT

The caster is essentially characterized by the fact that it includes at least one wheel 1 including a hub 10 and a train 11 situated around the hub 10, a cover-plate 21, clip elements 22 suitable for clipping the cover-plate to the hub 10, the clip elements 22 for clipping the cover-plate to the hub 10 including at least one hole 30 made in the hub 10, at least two hooks 31, 32 mounted to project from the intermediate cover-plate 21 so that when the cover-plate 21 is clipped to the hub 10, the two hooks 31, 32 deform elastically and catch on the edge 34 of the hole 30 defining between them an inter-hook empty space 35. Application to casters used for making it easier to move items such as pieces of furniture, suitcases mounted on casters, or the like.

4 Claims, 3 Drawing Sheets

(56) References Cited

U.S. PATENT DOCUMENTS

| | | | |
|---|---|---|---|
| 5,988,762 A * | 11/1999 | Asada et al. | 301/37.109 |
| 6,443,531 B1 * | 9/2002 | Hogan et al. | 301/37.42 |
| 6,508,518 B1 * | 1/2003 | Owen et al. | 301/111.03 |
| 7,651,171 B2 * | 1/2010 | Kinslow et al. | 301/37.31 |
| 2003/0178888 A1 | 9/2003 | Chang | |
| 2011/0248551 A1 * | 10/2011 | Scicluna | 301/37.26 |

* cited by examiner

FLANGED ROLLER

The present invention relates to casters having a protective cover-plate and/or hubcap, and of the kind commonly used for making items such as pieces of furniture, baggage, or the like easier to move.

In numerous fields, wheels or casters are known in which the hub is covered by a protective cover-plate and/or hubcap.

In general, such cover-plates are fastened by screw or other means or by resilient tabs, and when the wheels are of relatively large size, these cover-plates are easily clipped onto the hubs of the wheels and they remain clipped in place even when the wheels are subjected to relatively high levels of impact. This applies for example to cover-plates for motor vehicle wheels.

In contrast, for wheels of the caster type, such as those used for moving items such as pieces of furniture, and more particularly baggage or the like, fastening cover-plates onto the hubs of these wheels gives rise to difficulty, as does retaining them thereon, in particular when the casters are mounted on baggage that is often moved without taking care and that bangs more or less roughly against steps or the like.

By way of example, such casters are described in the prior art in WO 2009/141685 and US 2003/178888.

The caster of WO 2009/141685 has clips that catch onto the edge situated at the periphery of the hub, i.e. they are thus directly connected to the tread of the wheel, and they are thus likely to be subjected directly to impacts, which can lead to the above-mentioned drawback.

The caster of US 2003/178888 has an outer cover-plate fastened to the hub and an intermediate cover-plate sandwiched between the hub and the outer cover-plate and that is fastened mainly to the outer cover-plate, which can lead to the same drawbacks as those mentioned above.

Mention may also be made of the following two prior art documents: US 2003/178888 and EP 1 736 325.

Thus, an object of the present invention is to provide a caster having a hub and a cover-plate mounted on the hub, that mitigates to a great extent the above-mentioned drawbacks of casters of this type, while being of a structure that is relatively simple and inexpensive.

More precisely, the present invention provides a caster for making it easier to move articles such as pieces of furniture, baggage, or the like, and in accordance with accompanying claim 1.

Other characteristics and advantages invention appear from the following description given with reference to the accompanying illustrative but non-limiting drawings, in which.

It is stated initially that in the figures, the same references are used to designate the same elements regardless of the figures in which they appear and regardless of the way in which the elements are shown.

It is also stated that in the present description, if the adverb "substantially" is associated with a term qualifying given means, then the qualifying term may equally well be understood either strictly or approximately.

With reference to the accompanying figures, the present invention relates to a caster Ro of the kind used for making it easier to move items such as pieces of furniture, baggage, or the like, and in particular suitcases.

Figure 1:
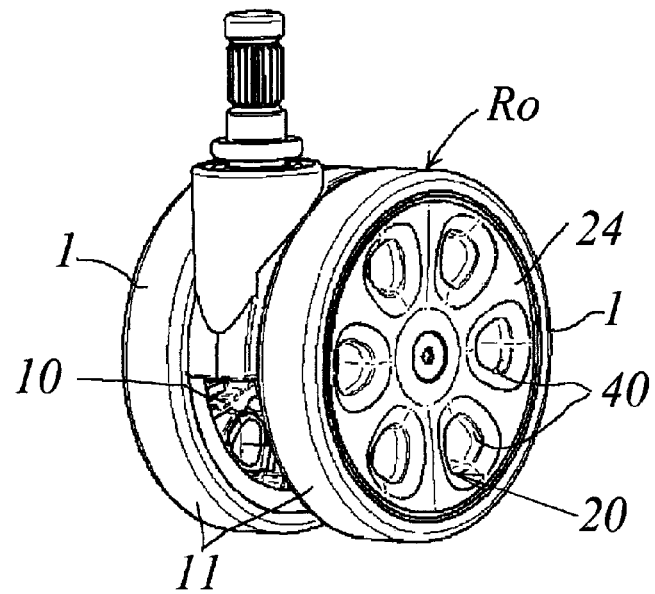
FIG. 1 is a perspective view of an embodiment of a caster of the invention fitted with a protective cover-plate and/or hubcap.

In the embodiment shown in FIG. 1, the caster Ro has two wheels, however the invention may be applied to a caster having only one wheel, such that the caster Ro of the invention has only one wheel 1 having a hub 10 and a tread 11 situated around the hub 10 about an axis X, and cover-plate means 20 that are mounted covering at least part of a face 12 of the hub 10.

Figure 2:
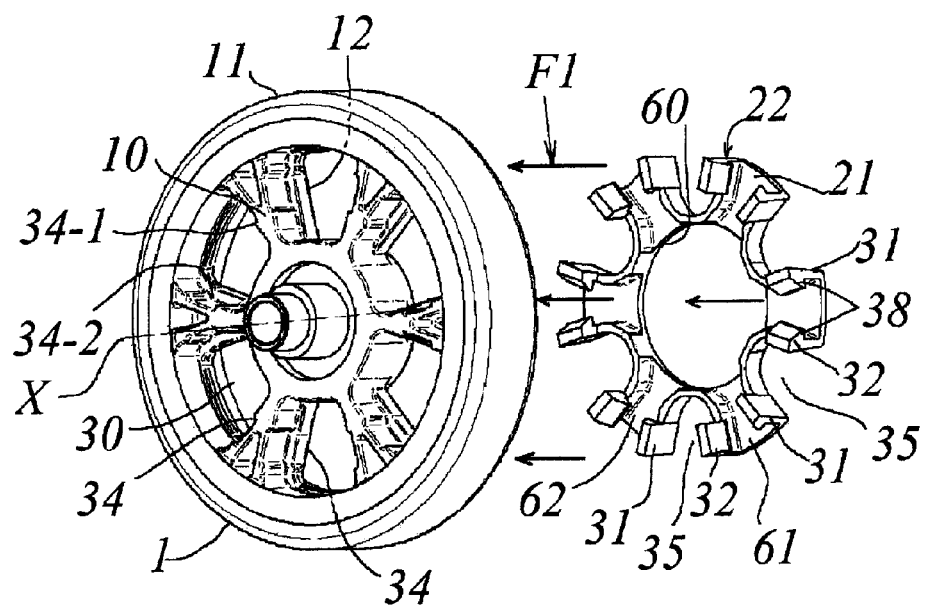
FIG. 2 is a perspective view of a step in assembling the FIG. 1 caster, and serving to explain a portion of the structure of the caster.
Figure 3:
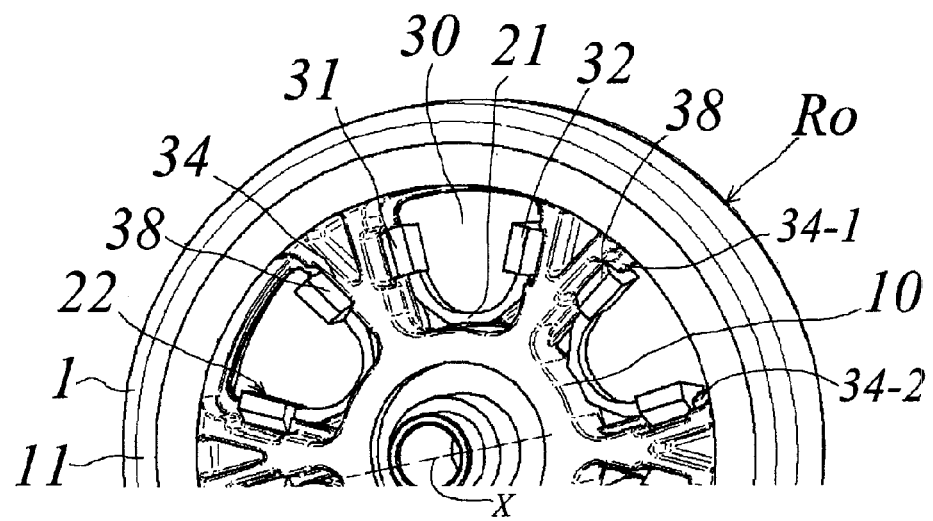
FIG. 3 is a fragmentary perspective view of the caster at the end of the assembly step shown in FIG. 2.
Figure 4:
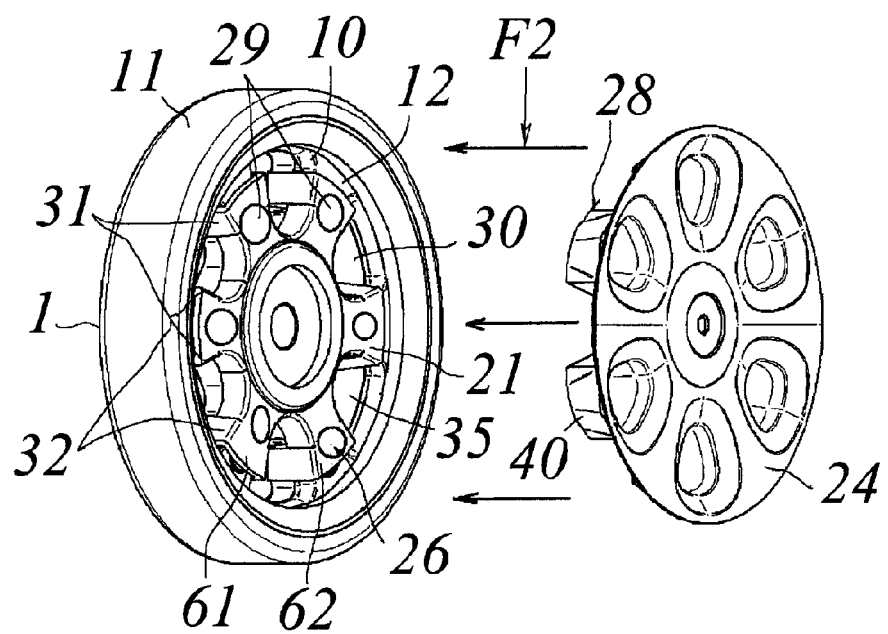
FIG. 4 is a perspective view of another step in assembling the caster that is performed after the step shown in FIGS. 2 and 3, and that serves to explain another portion of the structure of the caster.

According to a characteristic of the invention, and as can be seen more particularly in FIGS. 2, 3, and 4, these cover-plate means 20 comprise at least one cover-plate that is referred to for ease of understanding in the present description as an "intermediate" cover-plate 21, together with clip means 22 suitable for clipping the intermediate cover-plate to the face 12 of the hub 10.

Figure 5:
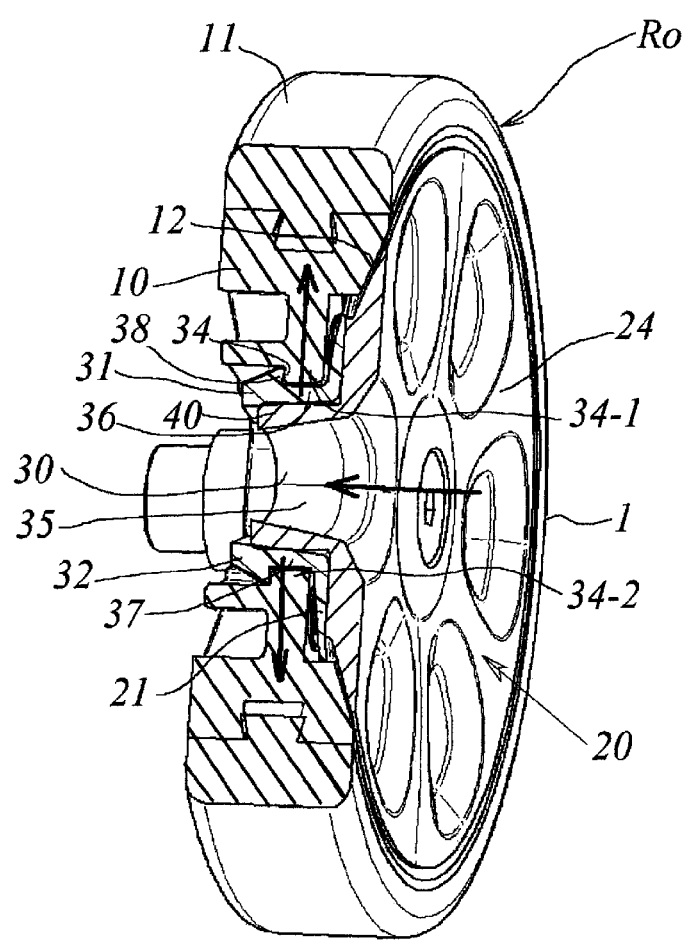
FIG. 5 is a fragmentary cut-away view in perspective of the caster at the end of the assembly step shown in FIG. 4.

The caster may also include another cover-plate that is referred to as a "main" cover-plate 24, as can be seen more particularly in FIGS. 1, 4, and 5, that is suitable for covering the intermediate cover-plate 21, together with means 26 for directly securing the main cover-plate 24 to the intermediate cover-plate 21 when the main cover-plate 24 covers the intermediate cover-plate 21, i.e. when the intermediate cover-plate 21 is indeed situated between the face 12 of the hub 10 and the main cover-plate 24.

According to another important characteristic of the invention, the caster also includes means 28 for blocking the clip means 22 on the hub 10 when the intermediate cover-plate 21 is clipped to the face 12 of the hub 10 and when the main cover-plate 24 covers the intermediate cover-plate 21 and is secured thereto.

This technique is very preferential when the intermediate cover-plate 21 and the main cover-plate 24 are made of two different materials, as explained in greater detail below.

According to a main and advantageous characteristic of the invention, the means 22 for clipping the intermediate cover-plate 21 to the face 12 of the hub 10, and regardless of whether the cover-plate 21 is on its own or associated with the main cover-plate 24, comprise at least one hole 30 made in the hub 10 and defined by an edge 34 having at least first and second opposite edge portions 34-1 and 34-2, these edge portions having a direction that is radial or substantially or approximately radial relative to the axis X of the hub 10, and at least two hooks 31 and 32 mounted to project from the intermediate cover-plate 21 in such a manner that when the intermediate cover-plate 21 is clipped on the face 12 of the hub 10, the two hooks 31 and 32 deform elastically and catch respectively on the first and second radial edge portions 34-1, 34-2 of the hole 30, while defining between them an inter-hook empty space 35.

As can be seen more particularly in FIG. 2, the two hooks 31 and 32 are advantageously situated in two planes that are substantially radial, still relative to the axis X of the hub 10, and they are arranged respectively on two extensions 61 and 62 situated at the periphery of the (hollow or solid) central portion 60 of the intermediate cover-plate 21 and substantially in its plane, in order to define between them a substantially U-shaped empty space.

In a preferred embodiment, the means 28 for blocking the clip means 22 on the hub 10, when the caster also has the main cover-plate 24, comprise a protuberance 40 projecting from the main cover-plate 24 and arranged in such a manner that when the main cover-plate is secured to the intermediate cover-plate, it is received in the inter-hook empty space 35 and comes into contact with both hooks 31, 32 in order to block them against the edge 34 of the hole 30 and prevent them from letting go of the edge 34.

In a preferred embodiment, each hook 31, 32 is constituted by a resilient tab 36, 37 that has a first end secured to the intermediate cover-plate via an extension 61, 62, and that has a second end remote from the first end and having a barb 38 secured thereto, the barb being arranged on the tab so as to take up a position behind the edge 34 of the hole 30.

As shown in FIGS. 4 and 5, the protuberance 40 is preferably constituted by a sleeve or the like having an outer side wall that is shaped, as shown in the cut-away portion of FIG. 5, to bear against the face of each tab 36, 37 that is opposite from its face carrying the barb 38, when the intermediate cover-plate 21 is clipped to the face 12 of the hub 10 and when the barbs are positioned behind the edge 34 of the hole 30.

The means 26 for securing the main cover-plate 24 with the intermediate cover-plate 21 may be constituted in various ways. Nevertheless, in an advantageous embodiment, these securing means 26 are made so as to enable the two cover-plates 24 and 21 to be assembled one against the other, while preserving between them a certain amount of freedom for relative movement. These securing means are preferably constituted by at least one spot of adhesive 29.

As can be seen in FIG. 4, which shows an advantageous embodiment of the caster, six spots of adhesive 29 are provided that are situated respectively on the six extensions 61, 62.

In the above description of the caster of the invention, the caster has a single hole 30 and two hooks 31, 32. Nevertheless, in general, even if the caster has only one wheel 1, it is preferable both in terms of the safety of the fastening of the cover-plate means 20 on the hub 10 of the wheel 1 and in terms of the appearance of the caster, for the hub 10 to have a plurality of holes 30, as shown in figures, the intermediate cover-plate 21 having the same number of pairs of hooks 31, 32, each pair of hooks being suitable for co-operating with a respective one of the holes 30, and the main cover-plate 24 has the same number of protrusions 40, each protrusion being suitable for co-operating with a respective one of the pairs of hooks.

In a preferred embodiment, the intermediate cover-plate 21 is made of a plastics material and the main cover-plate 24 is made of a metal material, e.g. of aluminum, of zamac, or of steel.

The caster of the invention, as described above and shown in the accompanying figures, is assembled as follows:

Firstly, it is assumed that the following three elements: the wheel 1; the intermediate cover-plate 21; and the main cover-plate 24; have already been preformed, as shown in particular in FIGS. 2 and 4, and that they are ready to be assembled so as to make a caster Ro, of the kind shown in FIG. 1.

In a first assembly step, the intermediate cover-plate 21 is presented in front of the hub 10 of the wheel 1, as shown in FIG. 2. These two elements are then moved towards each other, as represented by four arrows F1, until the six pairs of hooks 31, 32 penetrate respectively into the six holes 30.

While penetration is taking place, the tabs 36, 37 bend in elastic deformation, with the barbs 38 approaching each other and then coming into abutment against the edge of the hole 30. At the end of this penetration, the barbs are driven by the resilient return force generated by each of the tabs so as to clip into a position behind the edge 34 of each hole 30.

At the end of this first assembly step, the caster presents a configuration as shown in FIG. 3.

In a second assembly step, the six spots of adhesive 29 are applied, e.g. to the face of the intermediate cover-plate 21 remote from its face that is in contact with the face 12 of the hub 10.

In a third assembly step, the main cover-plate 24 is presented in front of the assembly that was obtained at the end of the first step together with its spots of adhesive (FIG. 4), and is then moved relative to said assembly along the three arrows F2 (or vice versa, or simultaneously), until the six protuberances 40 or sleeves penetrate respectively into the six inter-hook empty spaces 35, pressing the tabs 36, 37 against the edges of the holes 30, until the face of the main cover-plate that faces the spots of adhesive 29 comes into contact with the adhesive so as to be bonded to the intermediate cover-plate.

The person skilled in the art will have no difficulty in selecting the nature of the adhesive used, as a function of the respective materials from which the intermediate cover-plate 21 and the main cover-plate 24 are made.

From the above description, it can be seen that the caster of the invention achieves the objects defined in the introduction, namely, essentially: relatively low cost price; ease of assembling the cover-plate means on the wheel of the caster, and good ability of these cover-plate means to withstand impacts, in spite of the small size of the wheels in casters of this type that are used for moving pieces of furniture, baggage, or other wheeled suitcases.

The invention claimed is:

1. A caster for making it easier to move items such as pieces of furniture, baggage, or the like, the caster comprising:

At least one wheel comprising a hub of axis and a tread situated around the hub;

an intermediate cover-plate;

clip means suitable for clipping the intermediate cover-plate to said hub, wherein, the means for clipping the intermediate cover-plate to said hub includes at least one hole made in the hub, said one hole defined by an edge having at least first and second edge portions with a direction that is substantiallyradial relative to said axis of the hub, and at least two hooks mounted projecting from the cover-plate so that when the cover-plate is clipped to the hub, the two hooks deform elastically and catch respectively on the radial first and second edge portions while defining between them an inter-hook empty space;

a main cover-plate suitable for covering said intermediate cover-plate in such a manner that said intermediate cover-plate is interposed between said face of the hub and said main cover-plate;

means for securing said main cover-plate with said intermediate cover-plate when said main cover-plate covers said intermediate cover-plate; and means for covering said clip means on said hub when said intermediate cover-plate is clipped to the face of the hub and said main cover-plate covers the intermediate cover-plate and is secured thereto, wherein, said means for covering said clip means on said hub comprise a protrusion projecting from said main cover-plate and arranged in such a manner that, when said main cover-plate is secured to said intermediate cover-plate, the main cover-plate is received in said inter-hook empty space and comes into contact with both hooks in order to cover them on the edge of said hole.

2. A caster according to claim 1, wherein, each hook is constituted by a resilient tab secured to the cover-plate at a first end, and by a barb secured to the second end of the tab that is remote from the first end, said barb being arranged on said tab to occupy a position behind the edge of said hole, and said protrusion is constituted substantially by a sleeve having its outer side wall shaped to bear against said tabs when said intermediate cover-plate is clipped to the face of the hub and when the barbs are positioned behind the edge of said hole.

3. A caster according to claim 2, wherein, said hub has a plurality of holes;
   said intermediate cover-plate has the same number of pairs of hooks, each pair of hooks being suitable for co-operating with a respective hole; and
   said main cover-plate has the same number of protrusions, each protrusion being suitable for co-operating with a respective pair of hooks.

4. A caster for making it easier to move items such as pieces of furniture, baggage, or the like, the caster comprising:
   at least one wheel comprising a hub of axis and a tread situated around the hub;
   an intermediate cover-plate;
   clip means that clips the intermediate cover-plate to said hub, wherein,
   the means for clipping the intermediate cover-plate to said hub includes
   i) one hole made in the hub, said one hole defined by an edge having at least first and second edge portions with a direction that is substantially radial relative to said axis of the hub, and
   ii) at least one hook mounted projecting from the cover-plate, the one hook being caught by elastically deformation on one of the radial first and second edge portions of said one hole; a main cover-plate covering said intermediate cover-plate so that said intermediate cover-plate is interposed between said face of the hub and said main cover-plate;
   means securing said main cover-plate with said intermediate cover-plate; and
   means for covering said clip means on said hub when said intermediate cover-plate is clipped to the face of the hub with said main cover-plate covering the intermediate cover-plate and secured thereto,
   wherein, said means for covering said clip means on said hub comprise a protrusion projecting from said main cover-plate and arranged in such a manner that the main cover-plate is received in said inter-hook empty space and comes into contact with both hooks (31, 32) covering both hooks on the edge of said hole.

* * * * *